Figure 1:
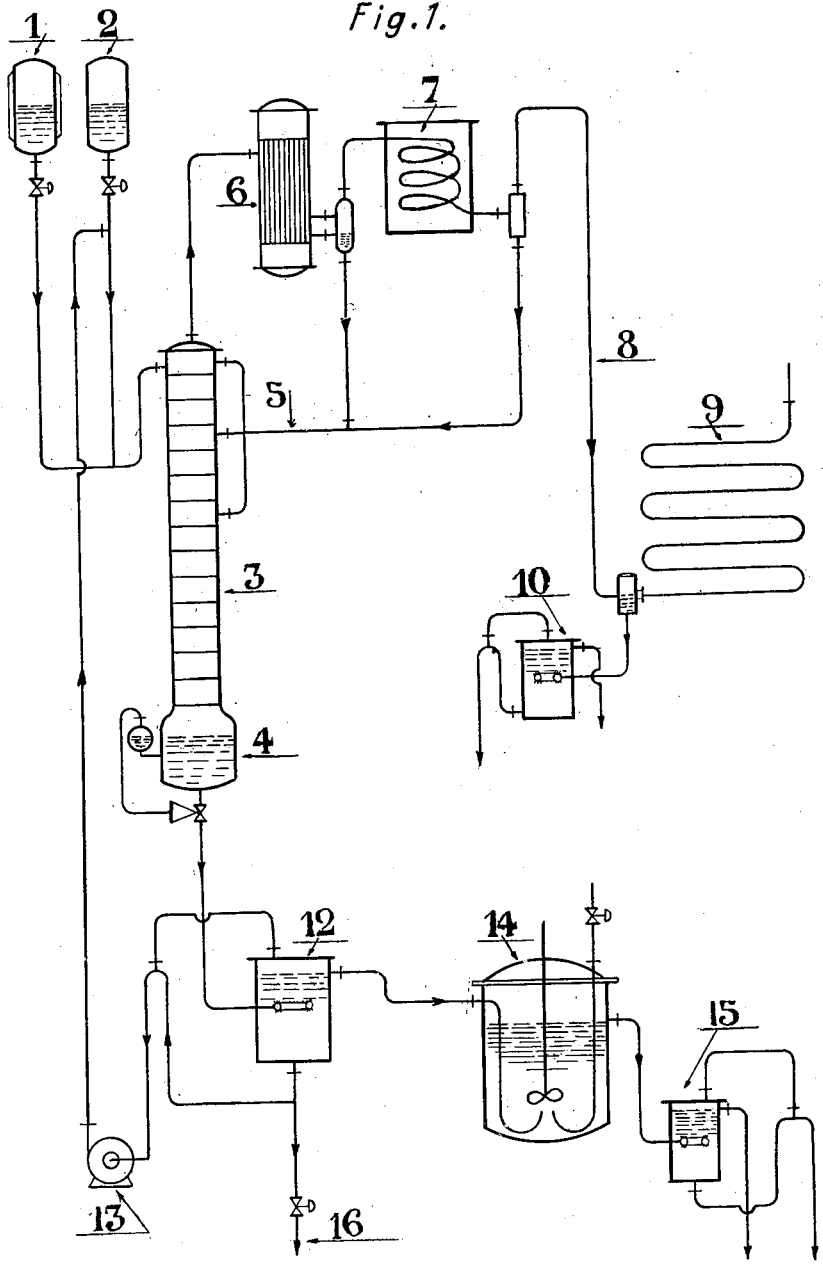

March 7, 1950     A. GISLON     2,499,488
SYNTHETIC PROCESS FOR MANUFACTURING OILY PRODUCTS
Filed June 15, 1946     3 Sheets-Sheet 3

INVENTOR
Andre Gislon
BY
Blair, Curtis + Hayward
ATTORNEYS

Patented Mar. 7, 1950

2,499,488

UNITED STATES PATENT OFFICE 2,499,488

SYNTHETIC PROCESS FOR MANUFACTURING OILY PRODUCTS

André Gislon, Paris, France, assignor to Compagnie Française de Raffinage (Societe Anonyme), Paris, France Application June 15, 1946, Serial No. 677,065
In France December 19, 1942

Section 1, Public Law 690, August 8, 1946
Patent expires December 19, 1962

4 Claims. (Cl. 260—671)

The condensation and polymerisation reactions with catalysts of the type called Friedel-Crafts, and in a general manner, all the reactions which involve the use of this type of catalyst, have always been described as essentially discontinuous operations.

In fact, even when such reactions produce more or less viscous oily products, they do not directly yield the finished product, but a complex that has to be destroyed artificially, for example by washing with water. On the other hand, the high viscosity of the products obtained most often involves diluting the complex very considerably with a solvent before destroying it.

In the majority of cases, such diluting and washing are utilized to stop the polymerisation at the desired degree, that is to say to regulate the duration of the reaction.

Although the possibility of regulating the degree of polymerisation by means of the proportions of constituents has already been pointed out previously, I was the first to show, in practice, in particular in my German patent application filed on June 23, 1942, under No. 57,449, entitled "Obtaining viscous lubricating oils and dopes," that it was possible, for instance, to produce comparatively slight degrees of polymerisation (molecular weight of the order of 300 to 500), while allowing the reaction to continue to the end, that is to say until the evolution of hydrochloric acid is completed when condensing, for example, an aromatic compound and an alkyl dihalogen.

I have now utilized this discovery, and also the presence of a large excess of solvent, to make the reaction continuous. The solvent may be one of the reacting elements, or a third substance.

According to the present invention, the reaction, instead of being carried out in a tank, is effected in a column, that is to say in a series of superposed elements, wherein the products to be treated are supplied to the top, the height of the column being so calculated that the reaction is completed when the products reach the base. The heat required for the reaction is supplied by the boiling of the solvent, the vapors of which circulate upwards and condense in the upper part, thereby producing a reflux of the solvent which favors the circulation of the products.

In the base, the complex diluted with the solvent is therefore obtained. Accordingly, it is possible to effect the continuous extraction of said complex and to subject it to subsequent operations of washing and decantation, which there is no difficulty in carrying out continuously.

The halogen acid is continuously evolved at the upper end of the column and it can be recovered by washing or any other means.

By way of a non-limitative example which is intended to make the invention clearly understood, one of the possible embodiments thereof will be described hereinafter with reference to the diagrammatic plant shown in the accompanying Fig. 1.

Assume, for example, that it is required to alkylate dibenzyl, contained in the heating tank 1, with butyl chloride contained in the tank 2 in the state of a complex with aluminum chloride. These two tanks feed, in a continuous manner, the upper part of a plate column 3 provided with a heating device not shown. The plate column may be replaced by a packed column or by any other suitable type. In such a reaction, the solvent is the butyl chloride, an excess of which circulates in a closed circuit in the plant.

The base 4 of the column 3 is provided with a constant level take-off regulator. The base is kept at a temperature of 95° C., whereas the top is kept at a temperature of 60° C. by means of the reflux 5 of butyl chloride coming from the condenser 6 and from the cooler 7. The hydrochloric acid, which flows through the pipe 8, is absorbed in any manner, for example by a stream of water, in a coil 9. The decanter 10 enables the small quantity of butyl chloride that may have been carried along to be recovered.

The oily complex, comprising the condensation product and aluminum chloride, diluted in an excess of butyl chloride, is extracted from the base and decanted at 12.

The lower layer is sucked up and delivered to the top of the column by the pump 13. The upper layer is hydrolysed at 14 and decanted at 15 after washing. The spent catalyst can be extracted at 16. It is of course understood that the treatment of the complex is not a part of the invention and that the hydrolysis described for the destruction of the complex may be completed by neutralisation or be replaced, in a known manner, by a treatment with alcohol followed by washing.

It will be observed that the process is remarkably well adapted for carrying out, in the same plant and likewise continuously, a plurality of successive reactions such, for example, as a condensation followed by an alkylation. It suffices to take a fairly high column, to feed to the top thereof the products to be condensed, then to supply the alkyl chloride to an intermediate plate, at a point where the condensation reaction is completed. The complex from the condensation is sufficient, in general, to catalyse the alkylation reaction. If necessary, a small quantity of fresh aluminum chloride or other appropriate catalyst may be introduced with the alkyl chloride.

The process is also well adapted to reactions in which one of the products is gaseous. For instance, if the alkylation is to be effected with a gaseous chloride, said chloride—or the unreacted mixture of chloride plus olefine and HCl—is supplied to the base of the column, and the product to be alkylated is fed to the top of the column. A counter-flow circulation is obtained which is particularly favorable for obtaining high efficiency.

I have also discovered that it is advantageous in the reaction and chiefly in condensation reactions, not to prolong unnecessarily the heating of the complex and that it is therefore preferable not to allow the complex to reach the base of the column or the boiler in which the heating is effected.

According to this improvement, the overflow from the last plate of the column does not fall into the base but is conveyed to a decanter. The whole or a part of the returning solvent is conveyed back to the base of the column. The vapors coming from the base pass through a nozzle and, pass without bubbling therein, through the last plate referred to above, and bubble in the penultimate plate.

Figure 2:
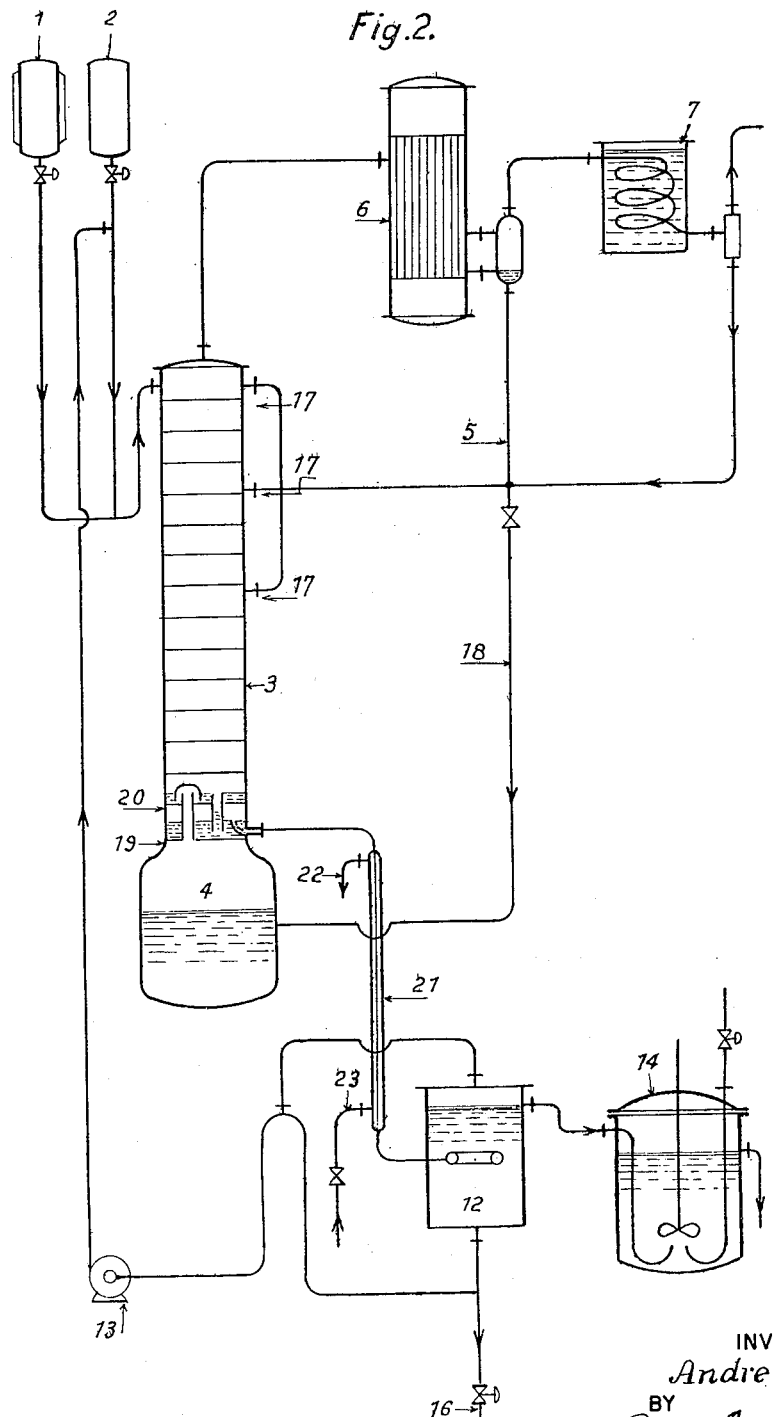
Figure 3:
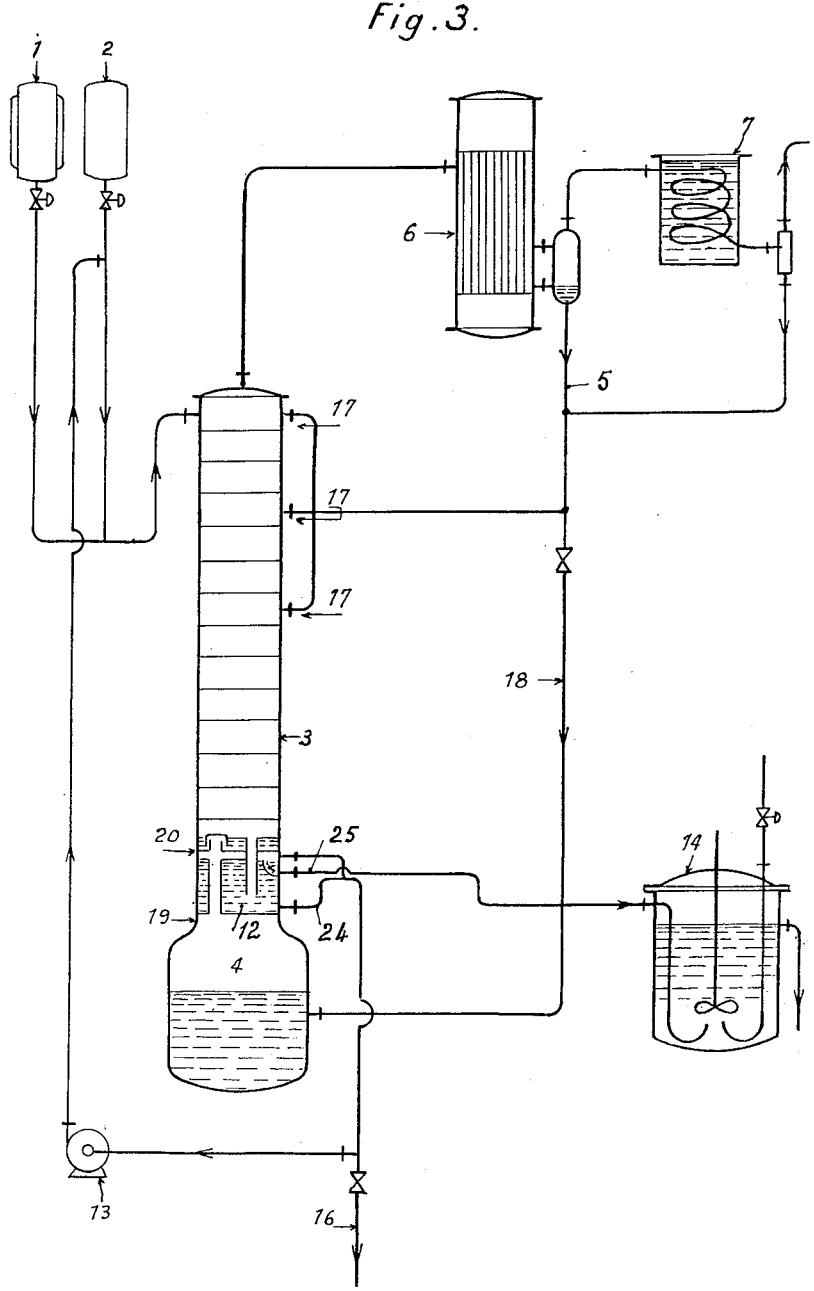

Figs. 2 and 3 of the drawing show, diagrammatically, two plants having these characteristics and which correspond to the previous example, the same reference numerals being retained therein for the corresponding parts.

In Fig. 2, the reflux 5 divides into two parts: one part returning at 17 to the first plates where it produces the excess of butyl chloride at the top, whereas another part is returned, through 18, to the base 4, the heating means of which are not shown.

The liquid from the last plate 19, which has been cooled in the heat exchanger 21, the cooling fluid of which flows in at 23 and flows out at 22, is conveyed to the decanter 12, whereas the vapors from the base 4 flow direct to the penultimate plate 20 where they bubble through the liquid of said plate, then rise from plate to plate.

Owing to the boiling temperature of butyl chloride, the temperature at the base of the column will only be about 70° C., which is nothing but an advantage; in point of fact, if, in a discontinuous process the tendency is to raise the temperature at the end of the reaction to about 90°-95° C., this is solely in order to accelerate said end and to make the reaction complete.

In the present process, the duration of the reaction, for a given supply, depends only on the number and the capacity of the plates.

A diagram has also been shown, in Fig. 3, of a variant of the process, according to which the decantation, instead of being effected in the cold state, is effected in the hot state. This variant may be advantageous for particularly viscous products.

In said variant, the decanter 12 is located in the column 3 and, in point of fact, is nothing other than the former plate 19 of the column 1, the capacity of which has been considerably increased so as to make a regular decanter of it.

The lower layer is drawn off at 24 and, as in Figs. 1 and 2 hereinbefore, is sucked up by the pump 13 and delivered to the head of the column.

The upper layer is drawn off at 25 and, as in Figs. 1 and 2, is conveyed to 14 to be hydrolyzed or subjected to any other treatment.

I claim:

1. A process for continuously producing an oily product which comprises establishing and maintaining an elongated substantially vertical reaction-fractionation zone adapted for carrying out a Friedel-Crafts type reaction, said reaction-fractionation zone being of predetermined length, supplying to an upper portion of the zone a liquid phase aromatic hydrocarbon as well as a liquid phase complex reactant comprising the reaction product of an alkyl halide and an aluminum chloride catalyst, said complex reactant being diluted with a suitable solvent, supplying heat to the base of the zone to cause solvent vapors to flow upwardly in intimate contact with the liquid reactants and to cause a Friedel-Crafts reaction to proceed thereby yielding an oily condensation product, removing vaporized solvent as well as halogen acid from the top of the zone, condensing vaporized solvent, returning condensed solvent to the top of the zone as reflux, and removing an oily condensation product admixed with excess solvent and catalyst from a lower portion of the zone.

2. A process for continuously producing an oily product which comprises establishing and maintaining an elongated substantially vertical reaction-fractionation zone adapted for carrying out a Friedel-Crafts type reaction, said reaction-fractionation zone being of predetermined length, supplying to an upper portion of the zone a liquid phase aromatic hydrocarbon as well as a liquid phase complex reactant comprising the reaction product of an alkyl halide and an aluminum chloride catalyst, said complex reactant being diluted with a suitable solvent, supplying solvent to the base of said zone, and supplying heat to the base of the zone to cause solvent vapors to flow upwardly in intimate contact with the liquid reactants and to cause a Friedel-Crafts reaction to proceed thereby yielding an oily condensation product, removing vaporized solvent as well as halogen acid from the top of the zone, condensing vaporized solvent, returning condensed solvent to the top of the zone as reflux, and removing an oily condensation product admixed with excess solvent and catalyst from a lower portion of the zone.

3. A process for continuously producing an oily product which comprises establishing and maintaining an elongated substantially vertical reaction-fractionation zone adapted for carrying out a Friedel-Crafts type reaction, said reaction-fractionation zone being of predetermined length, supplying to an upper portion of the zone a liquid phase aromatic hydrocarbon as well as a liquid phase complex reactant comprising the reaction product of an alkyl halide and an aluminum chloride catalyst, said complex reactant being diluted with a suitable solvent, supplying heat to the base of the zone to cause solvent vapors to flow upwardly in intimate contact with the liquid reactants and to cause a Friedel-Crafts reaction to proceed thereby yielding an oily condensation product, removing vaporized solvent as well as halogen acid from the top of the zone, condensing vaporized solvent, returning condensed solvent to the top of the zone as reflux, decanting oily condensation product from admixed solvent and catalyst from a lower portion of the zone while shielding the condensation product from direct exposure to the heat supplied to the base of the zone, and removing said decanted condensation product from the zone.

4. A process for continuously producing a viscous oily product which comprises establishing and maintaining an elongated substantially vertical reaction-fractionation zone adapted for carrying out a Friedel-Crafts type reaction, said reaction-fractionation zone being of predetermined length, supplying to an upper portion of the zone a liquid phase aromatic hydrocarbon as well as a liquid phase complex reactant comprising the reaction product of an alkyl halide and an aluminum chloride catalyst, said complex reactant being diluted with a suitable solvent, supplying heat to the base of the zone to cause solvent vapors to flow upwardly in intimate contact with the liquid reactants and to cause a Friedel-Crafts reaction to proceed thereby yielding a viscous oily condensation product, removing vaporized solvent as well as halogen acid from the top of the zone, condensing vaporized solvent, returning condensed solvent to the top of the zone as reflux, removing a viscous oily condensation product admixed with excess solvent and catalyst from the lower portion of the zone, and decanting said viscous oily condensation product from solvent and catalyst while hot.

ANDRÉ GISLON.

REFERENCES CITED

The following references are of record in the file of this patent:

UNITED STATES PATENTS

| Number | Name | Date |
| --- | --- | --- |
| 1,658,077 | Dearborn | Feb. 7, 1928 |
| 1,936,539 | Lelgemann | Nov. 21, 1933 |
| 1,950,308 | Jennings | Mar. 6, 1934 |
| 2,018,309 | Jones | Oct. 22, 1935 |
| 2,085,524 | Simo et al. | June 29, 1937 |
| 2,148,116 | Gerhart et al. | Feb. 21, 1939 |
| 2,198,595 | Amos et al. | Apr. 30, 1940 |
| 2,347,274 | McAfee et al. | Apr. 25, 1944 |
| 2,365,426 | Molique | Dec. 19, 1944 |
| 2,378,040 | Schulze | June 12, 1945 |
| 2,380,010 | Arnold | July 10, 1945 |
| 2,394,368 | Clarke | Feb. 5, 1946 |
| 2,404,536 | Schmerling et al. | July 23, 1946 |